(12) United States Patent
Callum

(10) Patent No.: US 6,320,964 B1
(45) Date of Patent: Nov. 20, 2001

(54) CRYPTOGRAPHIC ACCELERATOR

(75) Inventor: Roy Callum, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/140,166

(22) Filed: Aug. 26, 1998

(51) Int. Cl.$^7$ ................................................. H04L 9/06
(52) U.S. Cl. ........................ 380/29; 380/37; 713/189
(58) Field of Search ........................ 380/29, 37, 269; 713/189, 174

(56) References Cited

U.S. PATENT DOCUMENTS

| | | | |
|---|---|---|---|
| 4,177,355 | * 12/1979 | Fleisher et al. | 380/37 |
| 4,275,265 | * 6/1981 | Davida et al. | 380/29 |
| 4,352,952 | * 10/1982 | Boone et al. | 713/192 |
| 4,543,646 | * 9/1985 | Ambrosius, III et al. | 380/29 |
| 4,764,959 | 8/1988 | Watanabe et al. . | |
| 5,473,692 | 12/1995 | Davis . | |
| 5,539,828 | 7/1996 | Davis . | |
| 5,568,552 | 10/1996 | Davis . | |
| 5,633,932 | 5/1997 | Davis et al. . | |
| 5,751,809 | 5/1998 | Davis et al. . | |
| 5,757,915 | 5/1998 | Auesmith et al. . | |
| 5,796,840 | 8/1998 | Davis . | |
| 5,802,176 | 9/1998 | Audebert . | |
| 5,805,706 | 9/1998 | Davis . | |
| 5,805,712 | 9/1998 | Davis . | |
| 5,828,753 | 10/1998 | Davis . | |
| 6,028,939 | * 2/2000 | Yin | 713/189 |

OTHER PUBLICATIONS

Federal Information Processing Standards Publication, "Data Encryption Standard (DES)," FIPS PUB 46–2, 18 pages (Dec. 30, 1993).
Federal Information Processing Standards Publication 81, Specification for "DES Modes of Operation," 26 pages (Dec. 2, 1980).

* cited by examiner

Primary Examiner—Gilberto Barron, Jr.
(74) Attorney, Agent, or Firm—Blakely, Sokoloff, Taylor & Zafman LLP

(57) ABSTRACT

A cryptographic accelerator for handling instruction-intensive bit permutations. The cryptographic accelerator comprises a selector and a plurality of buses coupled to the selector. Herein, at least one of the plurality of buses includes signal lines routed to perform a bit permutation operation incoming data. The bit permutation operation is one of a plurality of operations associated with a symmetric key function.

13 Claims, 4 Drawing Sheets

CRYPTOGRAPHIC ACCELERATOR

BACKGROUND

1. Field

The present invention relates to the field of cryptography. More particularly, the present invention relates to a cryptographic accelerator.

2. General Background

Over the last decade, computers have become an important product for both commercial and personal use, in part due to their versatility. For example, computers are commonly used as a vehicle to transfer information over a communication link such as private networks or public networks. "Private networks" include any network having restricted access (e.g., a local area network), while "public networks" include any network allowing access to the public at large such as the Internet for example. In many situations, it may be desirable to encrypt digital information prior to transmission over the communication link so that the transmitted information is clear and unambiguous to a targeted recipient, but is incomprehensible to any illegitimate interlopers.

In 1981, the National Institute of Standards and Technology approved a data security process referred to as the "Data Encryption Standard." The Data Encryption Standard (DES) details the use of a cryptographic function, referred to as a "Data Encryption Algorithm" (DEA), for encrypting and decrypting digital information by a single, unique key. To ensure security of the transmitted information, the nature of the key is held in confidence between the source and the targeted recipient. DES and DEA are described in a Federal Information Processing Standards Publication 46-2 (FIPS PUB 46-2) entitled "Data Encryption Standard (DES)" which was published on or around Dec. 30, 1993.

In general, DEA features three (3) types of cryptographic operations; namely, bit permutations (or sometimes referred to as bit swapping), exclusive-OR (XOR) operations and table lookups. A "bit permutation" is a transposition of bits such that a bit pattern of input information differs from the bit pattern of output information. While XOR operations and table lookups can be adequately performed by software, bit permutations are more difficult to replicate in software.

Concise software code for emulating bit permutations is difficult to produce because there is no mathematical relationship between the input bit pattern and the output bit pattern. Instead, to achieve transposition, sub-programs are coded to test individual bits in the input pattern and then set reset bits in the output pattern, which greatly increases the number of instructions needed for a software implementation of DEA as shown in Table A.

TABLE A

| DES OPERATION | NUMBER OF OPERATIONS PER ENCRYPTION | PROCESSOR INSTRUCTIONS PER OPERATION |
| --- | --- | --- |
| Initial Permutation | 1 | 128 |
| Reverse Initial Permutation | 1 | 128 |
| Key Bit Selection PC-1 | 1 | 112 |
| Key Rotate | 16 | 96 |
| Key Bit Selection PC-2 | 16 | 1792 |
| XOR | 16 | 16 |
| E-Bit Selection | 16 | 256 |

TABLE A-continued

| DES OPERATION | NUMBER OF OPERATIONS PER ENCRYPTION | PROCESSOR INSTRUCTIONS PER OPERATION |
| --- | --- | --- |
| S Table Lookup | 128 | 128 |
| Bit Permutation | 16 | 1024 |
| Total | | 3680 |

As a result, encryption/decryption software in accordance with DEA is slow and costly due to increased programming costs and increased memory size to accommodate the complex software. Hence, it would be desirable to create a cryptographic accelerator which includes hardware to perform bit permutations and other instruction intensive operations while other operations are performed by software as normal. This would avoid substantial modification of current electronic systems and enhance the speed of the cryptographic accelerator.

SUMMARY

Briefly, one embodiment of the present invention includes a cryptographic accelerator comprising (i) a selector and (ii) a plurality of buses coupled to the selector. Herein, at least one of the plurality of buses includes signal lines routed to perform a bit permutation operation on incoming information. The bit permutation operation is one of a plurality of operations associated with a symmetric key function.

BRIEF DESCRIPTION OF THE DRAWINGS

The features and advantages of the present invention will become apparent from the following detailed description of the present invention, in which.

DETAILED DESCRIPTION

Herein, various embodiments of a cryptographic accelerator are shown in which the cryptographic accelerator comprises hardware that performs bit permutations and other types of instruction intensive cryptographic operations. Numerous details are set forth below in order to provide a thorough understanding of the invention. It should be apparent to one skilled in the art that the invention may be practiced by other embodiments without deviating from the spirit and scope of the invention. Also, well-known circuitry is not set forth in detail in order to avoid unnecessarily obscuring the invention.

In the detailed description, various terms and symbols are frequently used to describe certain characteristics or qualities. For example, "information" comprises data, address, control or any combination thereof. An "electronic system" includes any product having cryptographic processing functionality such as, for example, a computer (e.g., desktop, laptop, personal digital assistant, server, etc.), an image production unit (e.g., a facsimile machine, scanner, or printer), a communication unit (e.g., a cellular phone) and other types of products. A "processor" includes any device having processing capability such as, for example, a general purpose microprocessor, a microcontroller, a state machine and the like. A "bus" comprises one or more signal lines, each signal line comprising any type of medium (e.g., wire, fiber optics, radio frequency "RF" transmissions, etc.) to transfer information from a source to a destination. The symbol "#" represents that its corresponding signal is active-low.

With respect to terms relating to cryptography, a "key" is a parameter used for encrypting outgoing information to produce ciphertext and/or for decrypting incoming information to produce plaintext. "Plaintext" is defined as non-encrypted, digital information while "ciphertext" is defined as encrypted digital information. In this embodiment, the key includes 56-bits in succession, but it is contemplated that the key may be any bit size M, where "M" is a positive whole number normally greater than or equal to forty (40).

Figure 1:
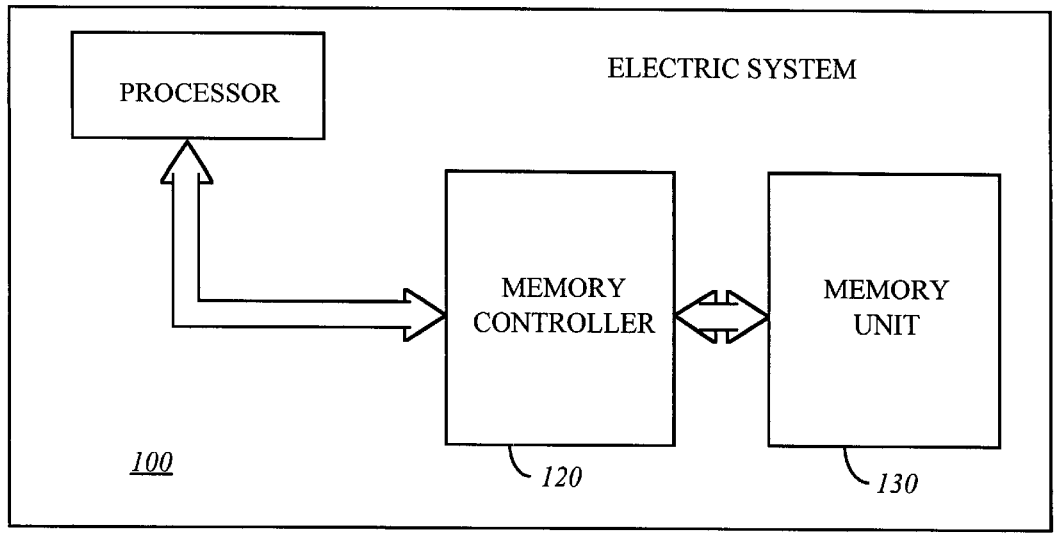
FIG. 1 is an illustrative embodiment of an electronic system including a processor utilizing the invention.

Referring to FIG. 1, an illustrative embodiment of an electronic system 100 utilizing the invention is shown. Electronic system 100 comprises a processor 110, a memory unit 120 and a memory controller 130. In this embodiment, processor 110 signals memory controller 130 to either obtain information from or write information into memory unit 130. Memory unit 130 includes, for example, volatile memory (e.g., static random access memory "SRAM"). However, it is contemplated that memory unit 130 may include non-volatile memory such as any type of programmable read only memory or even flash memory.

Figure 2:
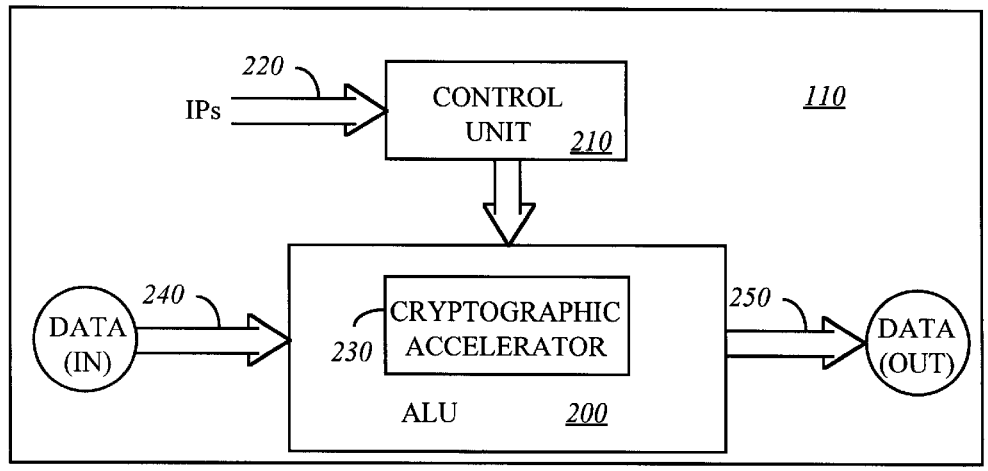
FIG. 2 is an illustrative block diagram of a cryptographic accelerator operating in cooperation with an arithmetic logic unit (ALU) of the processor of FIG. 1.

Referring now to FIG. 2, an illustrative embodiment of internal circuitry of processor 110 is shown. In this embodiment, processor 110 comprises an arithmetic logic unit (ALU) 200 and a control unit 210 which controls the operations of ALU 200 based on instruction pointers (IPs) received over an instruction pipeline 220. ALU 200 includes a cryptographic accelerator 230 being hardware which rearranges bit representations of incoming information 240 to produce outgoing information 250 in accordance with a selected cryptographic function. Cryptographic accelerator 230 reduces the amount of time required to encrypt and/or decrypt information. Herein, for illustration purposes, the selected cryptographic function is DES, but it is contemplated that the cryptographic accelerator 230 may be configured to support any symmetric cryptographic function.

Figure 3:
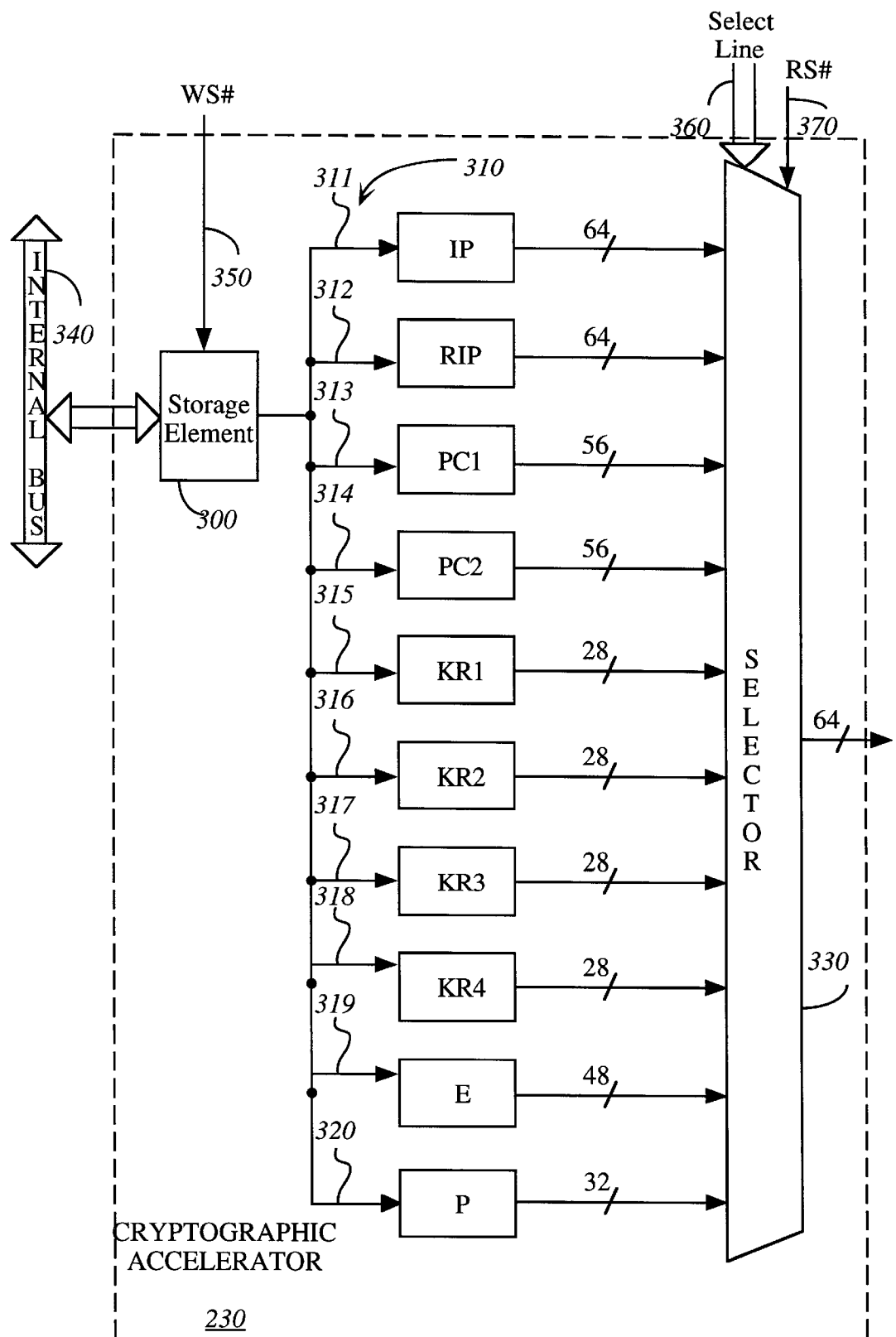
FIG. 3 is an illustrative embodiment of the cryptographic accelerator of FIG. 2.

Referring now to FIG. 3, one embodiment of cryptographic accelerator 230 comprises a storage element 300, a plurality of buses 310 and a selector 330 (e.g., one or more multiplexers, combinatorial logic, etc.). Storage element 300 includes one or more latches which synchronizes incoming information originating from an internal bus 340. While one or more latches are used to prevent latency in transferring the incoming information from internal bus 340 to buses 310, storage element 400 may include one or more flip-flops wherein latency is not critical to the operations of cryptographic accelerator 230. Also, it is contemplated that in other embodiments, the incoming information received by buses 310 may originate from another source besides storage element 300.

In this embodiment, buses 310 are arranged to modify incoming information (e.g., an incoming data block) in accordance with one or more selected instruction intensive cryptographic operations. In this embodiment, each bus 311–320 includes multiple signal lines which are arranged to receive an incoming data block upon assertion of a write strobe (WS#) signal on signal line 350. Buses 311–320 rearrange the bit representation of the incoming data block during transmission to selector 330. Whichever cryptographic operation is chosen by select signal lines 360, the resulting data is produced and output from cryptographic accelerator 230 upon assertion of a read strobe (RS#) signal on signal line 370.

As illustrative examples, various operations of DEA are implemented through a hardware implementation by rearrangement of signal lines so that the bit order of an incoming data block is different from the outgoing data block. The buses 311–320 comprise signal lines for performing (i) an initial permutation, (ii) various complex key-dependent computations, and (iii) an inverse of the initial permutation.

Figure 4:
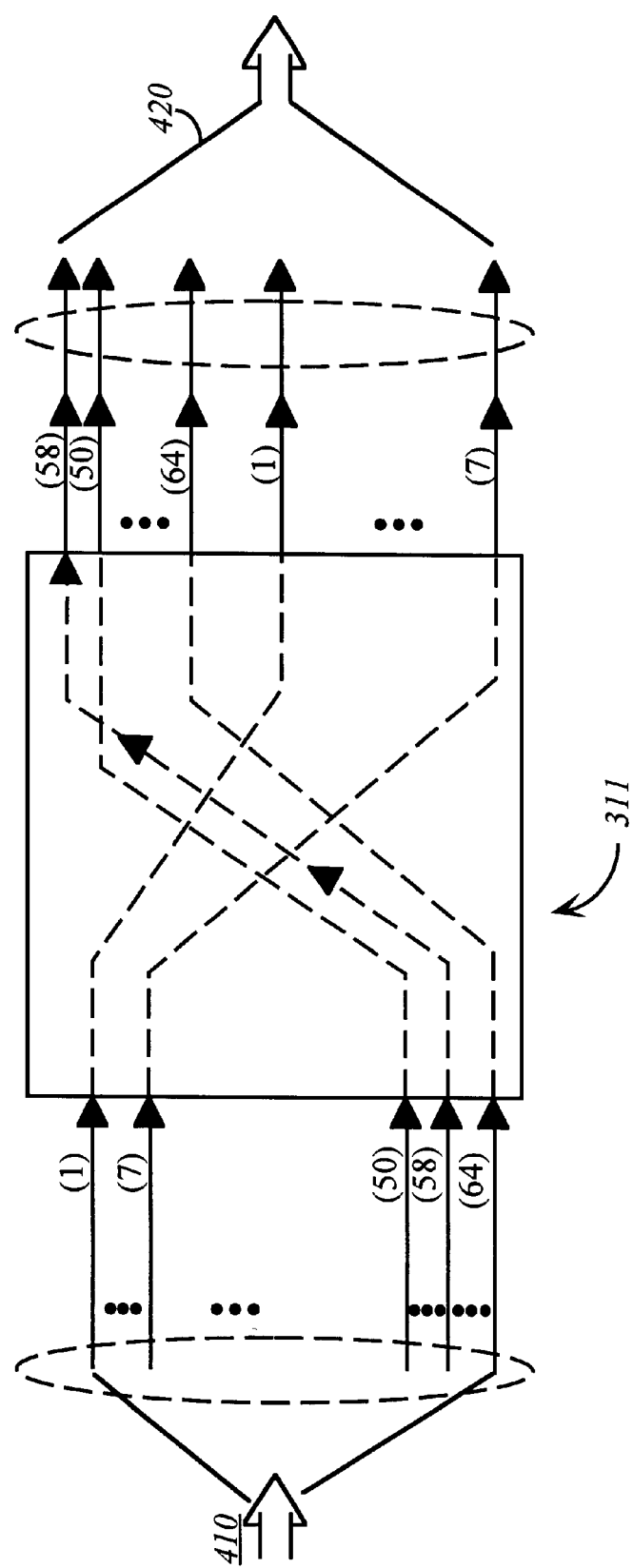
FIG. 4 is an illustrative embodiment of the initial permutation (IP) operation performed by the cryptographic accelerator of FIG. 3.

For example, referring to the initial permutation (IP) operation of FIG. 4, bus 311 includes sixty-four (64) signal lines which are arranged to receive an incoming data block 410 and to produce an outgoing data block 420 having a different bit order than the incoming data block 410. As shown, the fifty-eighth ($58^{th}$) bit of incoming data block 410 is rearranged as a first bit of outgoing data block 420. Also, the fiftieth ($50^{th}$) bit of incoming data block 410 is selected to be the second bit of outgoing data block 420 and the seventh ($7^{th}$) bit is arranged to be the last bit of outgoing data block 420. Thus, as shown in Table B, the IP operation of incoming 64-bit data block 410 creates the following outgoing data block 420, where the numbers correspond to the bit orders of the incoming data block. This illustrative scheme is also used for Tables C–D and F–G.

TABLE B

| Byte 1 | 58 | 50 | 42 | 34 | 26 | 18 | 10 | 2 |
| Byte 2 | 60 | 52 | 44 | 36 | 28 | 20 | 12 | 4 |
| Byte 3 | 62 | 54 | 46 | 38 | 30 | 22 | 14 | 6 |
| Byte 4 | 64 | 56 | 48 | 40 | 32 | 24 | 16 | 8 |
| Byte 5 | 57 | 49 | 41 | 33 | 25 | 17 | 9 | 1 |
| Byte 6 | 59 | 51 | 43 | 35 | 27 | 19 | 11 | 3 |
| Byte 7 | 61 | 53 | 45 | 37 | 29 | 21 | 13 | 5 |
| Byte 8 | 63 | 55 | 47 | 39 | 31 | 23 | 15 | 7 |

Figure 5:
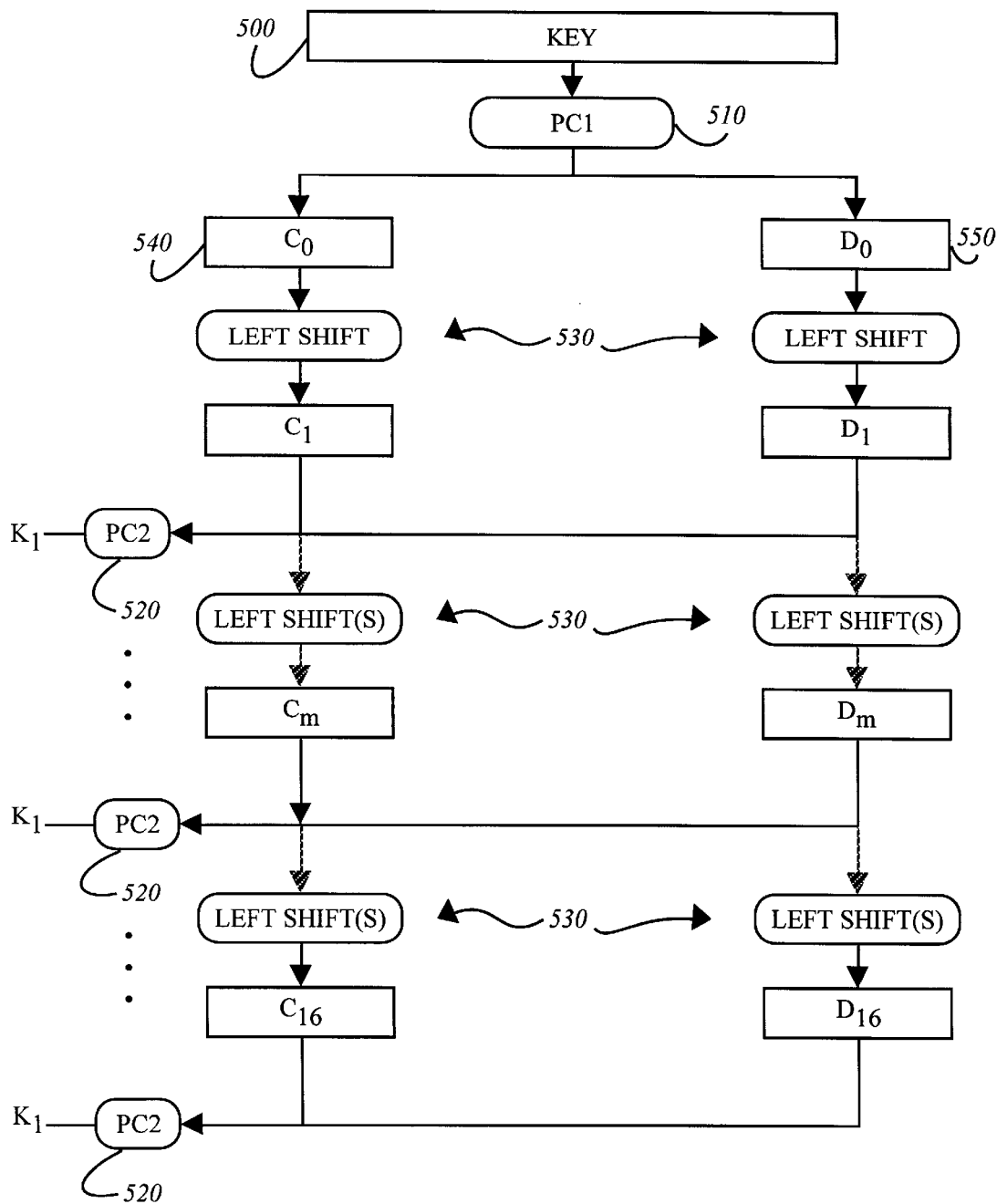
FIG. 5 is an illustrative embodiment of the production of key blocks K1–K16 used iteratively to encrypt information.

As described herein, complex key-dependent computations produce key blocks (K1–K16) and permuted inputs (Lx, Rx, where $0 \leq x \leq 16$ for example) as shown in FIG. 5. Produced from an original key 500, these key blocks K1–K16 are used iteratively to manipulate information being encrypted by original key 600.

In this embodiment, key blocks K1–K16 are produced through application of a first permuted choice (PC1) operation 510, a second permuted choice (PC2) 520 and bit shifting operations 530. The "PC1" operation 510 modifies the contents of original key 500 in order to produce a first data block ($C_0$) 540 and a second data block ($D_0$) 550. The bit representations of $C_0$ 540 and $D_0$ 550 are set forth in Table C, where one bit of each 8-bit byte (e.g., bits 8, 16, etc.) of original key 500 may be used for error detection.

TABLE C

| Byte 1 | 57 | 49 | 41 | 33 | 25 | 17 | 9 |
| Byte 2 | 1 | 58 | 50 | 42 | 34 | 26 | 18 |
| Byte 3 | 10 | 2 | 59 | 51 | 43 | 35 | 27 |
| Byte 4 | 19 | 11 | 3 | 60 | 52 | 44 | 36 |
| Byte 1 | 63 | 55 | 47 | 39 | 31 | 23 | 15 |
| Byte 2 | 7 | 62 | 54 | 46 | 38 | 30 | 22 |
| Byte 3 | 14 | 6 | 61 | 53 | 45 | 37 | 29 |
| Byte 4 | 21 | 13 | 5 | 28 | 20 | 12 | 4 |

As shown, data blocks 540 and 550 are used to obtain subsequent data blocks $C_n$ and $D_n$ ($1 \leq n \leq 16$) through the second permutated choice (PC2) operation. A "PC2" operation produces a new data block based on a predetermined schedule of left shifts from a preceding data block. An example of bitwise processing of a PC2 operation in accordance to DEA is shown in Table D.

TABLE D

| 14 | 17 | 11 | 24 | 1  | 5  |
|----|----|----|----|----|----|
| 3  | 28 | 15 | 6  | 21 | 10 |
| 23 | 19 | 12 | 4  | 26 | 8  |
| 16 | 7  | 27 | 20 | 13 | 2  |
| 41 | 52 | 31 | 37 | 47 | 55 |
| 30 | 40 | 51 | 45 | 33 | 48 |
| 44 | 49 | 39 | 56 | 34 | 53 |
| 46 | 42 | 50 | 36 | 29 | 32 |

Herein, the new data block is obtained by a circular shift of one bit to the left of data block ($C_0$) 540 and a circular shift of one bit to the left of data block ($D_0$) 550. Thus, a first key block (K1) of DEA is a circular left shift of each individual data block $C_0$ 540 and $D_0$ 550. Data block ($C_0$, $D_0$) 540 and 550 are then recombined to form K1. The shift schedule for producing the key blocks is set forth in Table E (see page 18 of FIPS PUB 46-2).

TABLE E

| ITERATION NUMBER | NUMBER OF LEFT SHIFTS FROM PRIOR DATA BLOCKS |
|---|---|
| 1  | 1 |
| 2  | 1 |
| 3  | 2 |
| 4  | 2 |
| 5  | 2 |
| 6  | 2 |
| 7  | 2 |
| 8  | 2 |
| 9  | 1 |
| 10 | 2 |
| 11 | 2 |
| 12 | 2 |
| 13 | 2 |
| 14 | 2 |
| 15 | 2 |
| 16 | 1 |

Herein back to FIG. 3, buses 315–318 provide various degrees of bit shifting for an incoming data block. For example, KR1 and KR2 buses 315 and of one bit and two bits, respectively. These bits are used for decryption purposes. Similarly, KR3 and KR4 buses 317 and 318 provide left shifts of one bit and two bits, respectively. This bit shifting may be used to perform the shift schedule of Table E.

The expansion permutation (E) produces a 48-bit outgoing data block based on a 32-bit incoming data block as shown in Table F. The outgoing data block is expanded from its 32-bit width to a 48-bit outgoing data block so that the 48-bit outgoing data block may be bitwise ANDed with the original key. Thereafter, the conversion for the 48-bit output to a 32-bit input used by the permutation (P) operation is accomplished by one or more selection functions set forth in page 11 of the Appendix of FIPS Pub 46.2.

TABLE F

| 32 | 1  | 2  | 3  | 4  | 5  |
|----|----|----|----|----|----|
| 4  | 5  | 6  | 7  | 8  | 9  |
| 8  | 9  | 10 | 11 | 12 | 13 |
| 12 | 13 | 14 | 15 | 16 | 17 |
| 16 | 17 | 18 | 19 | 20 | 21 |
| 20 | 21 | 22 | 23 | 24 | 25 |
| 24 | 25 | 26 | 27 | 28 | 29 |
| 28 | 29 | 30 | 31 | 32 | 1  | the permutation (P) operation yields a 32-bit output based on a 32-bit inputs by permuting the bits of a input data block for further obfuscate the original contents of the input data block provided to the permutation bus lines. An example of the output of the function is defined in Table G.

TABLE G

| 16 | 7  | 20 | 21 |
|----|----|----|----|
| 29 | 12 | 28 | 17 |
| 1  | 15 | 23 | 26 |
| 5  | 18 | 31 | 10 |
| 2  | 8  | 24 | 14 |
| 32 | 27 | 3  | 9  |
| 19 | 13 | 30 | 6  |
| 22 | 11 | 4  | 25 |

It is contemplated that the decryption of a data block may be accomplished by generating the key data blocks in reverse order since DEA is a symmetric cryptographic function.

The present invention described herein may be designed in many different methods and using many different configurations. While the present invention has been described in terms of various embodiments, other embodiments may come to mind to those skilled in the art without departing from the spirit and scope of the present invention. The invention should, therefore, be measured in terms of the claims which follows.

What is claimed is:

1. A cryptographic accelerator comprising:
   a select circuit; and
   a plurality of buses coupled to the select circuit, of the plurality of buses include
      a first bus having signal lines arranged to perform an initial permutation operation in accordance with a symmetric key function,
      a second bus having signal lines arranged to perform a first permuted choice operation in accordance with the symmetric key function in order to modify contents of an original key by producing a first data block and a second data block,
      a third bus having signal lines arranged to perform a second permuted choice operation in accordance with the symmetric key function in order to modify the first data block and the second data block to produce a key block, the key block being one of a plurality of keys used to iteratively encrypt incoming information, and
      a fourth bus having signal lines arranged to perform a one-bit right shift on a bit representation of the incoming information.

2. The cryptographic accelerator of claim 1, wherein the symmetric key function includes a Data Encryption Process of a Data Encryption Standard.

3. The cryptographic accelerator of claim 1, wherein the select circuit includes a multiplexer.

4. The cryptographic accelerator of claim 1 further comprising at least one latch coupled to the plurality of buses.

5. The cryptographic accelerator of claim 1, wherein a bus of the plurality of buses includes signal lines arranged to perform a two-bit right shift of the bit representation on the incoming information.

6. The cryptographic accelerator of claim 1, wherein a bus of the plurality of buses includes signal lines arranged to perform a one-bit left shift on the bit representation of the incoming information.

7. The cryptographic accelerator of claim 1, wherein a bus of the plurality of buses includes signal lines arranged to perform a two-bit left shift on the bit representation of the incoming information.

8. An electronic system comprising:

a memory controller; and a processor coupled to the memory controller, the processor including a cryptographic accelerator having a selector, and a plurality of buses coupled to the selector, the plurality of buses exclusively performing bit permutation operations on incoming information to rearrange bit ordering of the incoming information in accordance with a symmetric key function, the plurality of buses includes a first bus including signal lines arranged to perform an initial permutation operation in accordance with the symmetric key function, a second bus including signal lines arranged to perform a first permuted choice operation in accordance with the symmetric key function in order to modify contents of an original key by producing a first data block and a second data block, and a third bus including signal lines arranged to perform a second permuted choice operation in accordance with the symmetric key function in order to modify the first data block and the second data block to produce a key block, the key block being one of a plurality of keys used to iteratively encrypt the incoming information.

9. The electronic system of claim 8, wherein a fourth bus of the plurality of buses of the cryptographic accelerator including signal lines arranged to perform a one-bit right shift on a bit representation of the incoming information.

10. The electronic system of claim 9, wherein a fifth bus of the plurality of buses in accordance with the symmetric key function in order perform a two-bit right shift of the bit representation on the incoming information.

11. The electronic system of claim 10, wherein a sixth bus of the plurality of buses in accordance with the symmetric key function in order perform a one-bit left shift on the bit representation of the incoming information.

12. The electronic system of claim 11, wherein a seventh bus of the plurality of buses in accordance with the symmetric key function in order perform a two-bit left shift on the bit representation of the incoming information.

13. The electronic system of claim 8, wherein the cryptographic accelerator is implemented within an arithmetic logic unit of the processor.

* * * * *

UNITED STATES PATENT AND TRADEMARK OFFICE
CERTIFICATE OF CORRECTION

PATENT NO.   : 6,320,964 B1
DATED        : November 20, 2001
INVENTOR(S)  : Callum It is certified that error appears in the above-identified patent and that said Letters Patent is hereby corrected as shown below:

Column 5,
Line 51, delete "buses 315 and of one bit" and insert -- buses 315 and 316 provide right shifts of one bit --.

Column 6,
Line 12, delete "the permutation" and insert -- The permutation --.
Line 13, delete "a 32-bit inputs" and insert -- a 32-bit input --.

Signed and Sealed this

Eighth Day of October, 2002

Attest:

JAMES E. ROGAN
Attesting Officer            Director of the United States Patent and Trademark Office